(12) United States Patent
Katsaros et al.

(10) Patent No.: US 10,247,236 B2
(45) Date of Patent: Apr. 2, 2019

(54) BEARING RING

(71) Applicant: AKTIEBOLAGET SKF, Goeteborg (SE)

(72) Inventors: Padelis Katsaros, Schweinfurt (DE); Volker Wendt, Uechtelhausen/Zell (DE)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/715,861

(22) Filed: Sep. 26, 2017

(65) Prior Publication Data

US 2018/0017104 A1     Jan. 18, 2018

Related U.S. Application Data

(63) Continuation of application No. 14/869,233, filed on Sep. 29, 2015, now abandoned.

(30) Foreign Application Priority Data

Sep. 29, 2014   (DE) .......................... 10 2014 219 705

(51) Int. Cl.
*F16C 19/36* (2006.01)
*F16C 33/58* (2006.01)
(Continued)

(52) U.S. Cl.
CPC ............ *F16C 27/04* (2013.01); *F16C 33/586* (2013.01); *F16C 35/07* (2013.01); *F16C 19/36* (2013.01); *F16C 2226/74* (2013.01)

(58) Field of Classification Search
CPC ........ F16C 19/36; F16C 19/364; F16C 27/04; F16C 33/34; F16C 33/36; F16C 33/366;
(Continued)

(56) References Cited

U.S. PATENT DOCUMENTS 7,537,391 B2 *  5/2009  Smook ................... F16C 19/26
                                                      384/513
2004/0131297 A1   7/2004  Leimann

FOREIGN PATENT DOCUMENTS

CN         203594690 U         5/2014
DE         102009032700    *   1/2011
(Continued)

*Primary Examiner* — James Pilkington
(74) *Attorney, Agent, or Firm* — Bryan Peckjian; SKF USA Inc. Patent Dept.

(57) ABSTRACT

A rolling-element bearing assembly includes a support element and a bearing ring mounted on the support element. The bearing ring includes a substantially axial mounting surface in contact with the support element and a running surface configured to support a rolling element. The running surface has a first edge and a second edge axially spaced from the first edge and an axial width of the running surface is greater than an axial width of the mounting surface. The bearing ring includes a first cantilevered portion having a top surface, the top surface being a first end portion of the running surface, and a bottom surface facing the support element. The first cantilevered portion does not contact the support element and, extending axially from a junction of the support element and the mounting surface, a radial width of the first cantilevered portion decreases and then increases.

15 Claims, 4 Drawing Sheets

(51) Int. Cl.
*F16C 27/04* (2006.01)
*F16C 35/07* (2006.01)

(58) Field of Classification Search
CPC ...... F16C 33/58; F16C 33/583; F16C 33/585;
F16C 33/586; F16C 35/07
See application file for complete search history.

(56) References Cited

FOREIGN PATENT DOCUMENTS

DE  102009032700 A1  1/2011
FR  52822  *  4/1943

* cited by examiner

BEARING RING

CROSS-REFERENCE

This application is a continuation of U.S. Ser. No. 14/869,233, filed Sep. 29, 2015, which claims priority to German patent application no. 10 2014 219 705.8 filed on Sep. 29, 2014, and the contents of these applications are fully incorporated herein by reference.

TECHNOLOGICAL FIELD

The present disclosure relates to a bearing ring for a rolling-element bearing, in particular for a tapered roller bearing, as well as a rolling element with line contact for a rolling-element bearing, and a rolling-element bearing including such a bearing ring and/or such a rolling element.

BACKGROUND

Rolling-element bearings with line contact are bearings in which the rolling elements contact running surfaces of the bearing rings along a line. In such bearings, and in particular, in tapered roller bearings having line contact, off-center loads can produce a skewing/misalignment at mutually opposing ends of the rolling elements. This skewing/misalignment can lead to very high bearing loads, sometime referred to as edge stresses. It has therefore been proposed in the prior art to provide bearing components, in particular bearing rings and rolling elements, with a convex profile that allows a load to be distributed relatively uniformly over the rolling elements even in the case of an uneven load or skewing. The convex profile is usually formed on the running surfaces and/or the rolling elements by grinding and/or honing the surfaces after turning and hardening the bearing components. The profiles ensure that loads are relatively uniformly distributed over the rolling elements even in the case of uneven loading or skewing.

A disadvantage with using convex profiles is that the profiling operation must be performed with high precision. This is only possible to a limited extent over the course of a long production period. This is because, for example, the grinding and honing stones used to form the profile may wear over the course of production, and this can result in an increasing deviation of the profile from the target. In some cases, this deviation can even increase the edge stress problem. In addition, the processing/machining of the bearing components is very cost-intensive.

A further disadvantage of using profiled elements is that, because of the profiling, the rolling elements no longer abut on the running surfaces over their entire lengths. This in turn increases the pressure load on the rolling elements and thus reduces the load capacity of the rolling-element bearing.

SUMMARY

An aspect of the present disclosure is therefore to provide a rolling-element bearing that is simple to produce, that has a long service life, and that is resistant to problems that can be caused by skew or uneven or offset loads.

According to aspects of the disclosure a bearing ring for a rolling-element bearing, in particular for a tapered roller bearing, is provided. The bearing ring includes a running surface for a rolling element and a mounting surface extending essentially axially, and the bearing ring is configured to connect to a to-be-supported element such that they rotate together. Furthermore, the bearing ring includes a first and a second edge surface extending essentially radially, which edge surfaces axially delimit the bearing ring. In order to reduce edge stresses, while simultaneously supporting the at least one rolling element along its entire length on the running surface of the bearing ring, the bearing ring includes on at least one of its edge surfaces an edge which is designed to be flexible under pressure load. Due to this flexibility the edge stress can be counteracted without the need to provide the running surface of the bearing ring and/or of the rolling elements with a profile. The flexible edge can yield under pressure load so that the edge stresses can be reduced. Of course, however, despite the flexible edge it is also still possible to provide a profiling of one or more of the bearing components.

According to a further advantageous exemplary embodiment, the flexible edge is formed over at least one recess formed in the first and/or second edge surface and/or in the mounting surface. Since bearing rings are usually manufactured from steel or metal and are formed solid, the inventively designed recess makes it possible to form a flexible edge via a reduction in material in the edge region. Here the flexible edge can be adapted in terms of its material strength to the expected loads, and above all with respect to its flexibility. If now due to skewing of the bearing components a pressure is exerted on this edge by a rolling element, then due to the recess the edge can flex away from the rolling element and thereby mitigate the edge stress that would otherwise arise According to a further advantageous exemplary embodiment, the recess is groove-shaped. Such a groove can be turned in the bearing ring or even formed during forging. Unlike a profiling, creating the groove does not require high-precision work and it is therefore easier and more cost-effective to manufacture a bearing ring with a groove than a profiled bearing ring.

Alternatively or additionally, the recess can be designed larger, so that the recess extends up to the mounting surface, and so that the running surface has a greater axial extension than the mounting surface. Such a recess can be produced, for example, by a corresponding shaping during forging or turning. This design is also easy to produce and therefore cost-effective to form. Of course it is also possible to provide a first recess in the shape of a groove and a second recess that extends up to the mounting surface.

As a further advantageous exemplary embodiment shows, in order to achieve a particularly good spring action the mounting surface can include a first mounting-surface region and a second mounting-surface region radially offset to the first mounting-surface region, which second mounting-surface region merges into the edge region and forms the flexible edge. A gap is thus formed between the mounting-surface region of the bearing ring and an element receiving the bearing ring, which gap makes possible a bending- or springing-in for the flexible edge. Since in particular in tapered roller bearings the mounting ring has only a very small edge surface on its larger diameter, which edge surface merges directly into the mounting surface, and the mounting surface directly contacts the to-be-supported element, it is advantageous to integrate the mounting surface into the edge design and for a space to be provided over the radially offset mounting surface region into which the flexible edge can bend or spring in.

According to a further advantageous exemplary embodiment, the first and/or second edge surface includes a first edge-surface region and a second edge-surface region axially displaced with respect to the first edge-surface region, wherein the first or the second edge-surface region forms the flexible edge. In this way the space required for the flexible design of the edge can be provided even if the bearing ring directly contacts an axially-adjacently-disposed element. This is particularly advantageous if the bearing ring is axially secured by a securing element, which in particular can extend beyond the entire radial extension of the bearing ring.

The above-mentioned inventive design of the bearing rings is particularly advantageous in outer rings, since a profiling of the inwardly facing running surfaces can reduce their ability to guide the rolling elements. In addition, the required geometries for the flexible edge can be formed in a simple and rapid manner, for example, by turning the outer ring.

If the flexible edge is formed on the inner ring, this shape can also be implemented without problems on the small diameter of the raceway. For example, a guide flange that is convex towards the raceway can be provided on the outer diameter with its adjacent guide flange in order to provide a good rolling guiding and also allow a raceway region to deform.

Alternatively or additionally, of course, a rolling element itself can also contribute to a reduction of the edge stress. For this reason a further aspect of the present disclosure relates to a rolling element with line contact for a rolling-element bearing, in particular a tapered roller, wherein the rolling element has a circumferential surface that is designed to contact a running surface along a line. Furthermore, the rolling elements include two essentially radial boundary surfaces. The circumferential surface is inventively designed such that an edge region designed to be flexible is provided at least in the region of one of the radial boundary surfaces. This can be realized, for example, via a material reduction in the edge region, for example, in the form of a hollowing-out. As already explained above with respect to the bearing rings, this flexible end region makes it possible that in particular in the event of skewings, wherein high loads arise on the edges of the rolling-element bearing, either the edges of the bearing rings supporting the rolling elements and/or just the edges of the rolling elements can flex. As a result, a cushioned (spring-absorbed) tipping of the rolling elements can be made possible, whereby the edge-stress peaks can be decreased or reduced.

A further aspect of the present invention relates to a rolling-element bearing including a first and a second bearing ring that are configured to be rotatable with respect to each other, and between which at least one rolling element is received. Here the first and/or the second bearing ring and/or the rolling element is configured with a flexible edge as described above. In this way a rolling-element bearing can be provided that has reduced edge stress and whose service life is thereby increased.

Another aspect of the disclosure comprises a bearing ring for a rolling-element bearing that includes a mounting surface having a first length, and a running surface configured to support a rolling element that has a second length. The running surface has first and second axially spaced end portions, and at least one of the first and second axially spaced end portions comprises a cantilever. As used herein, the word "cantilever" refers to the appearance of the end portions of the running surface in section, as illustrated in FIGS. 1 and 2, for example. The "cantilever" actually comprises a continuous ring extending around the axis of rotation of the bearing, but the word cantilever is intended to convey the sense of a portion that projects in the manner of a conventional cantilever.

A further aspect of the disclosure comprises a rolling-element bearing assembly that includes a support element and a bearing ring mounted on the support element. The bearing ring comprises a substantially axial mounting surface in contact with the support element and a running surface configured to support a rolling element. The running surface has a first edge and a second edge axially spaced from the first edge and an axial width of the running surface is greater than an axial width of the mounting surface. The bearing ring includes a first cantilevered portion having a top surface that comprises a first end portion of the running surface and the first cantilevered portion also has a bottom surface facing the support element. The first cantilevered portion does not contact the support element. Extending axially from a junction of the support element and the mounting surface, starting from the junction, for example, a radial width of the first cantilevered portion decreases and then increases.

Yet a further aspect of the disclosure comprises a rolling-element bearing assembly including a support element and a bearing ring mounted on the support element. The bearing ring comprises a substantially axial mounting surface in contact with the support element and a running surface configured to support a rolling element. The running surface has a first edge and a second edge axially spaced from the first edge. The bearing ring has a first edge surface extending from the first edge of the running surface to the axial mounting surface and a second edge surface extending from the second edge of the running surface to the axial mounting surface. The first edge surface and the second edge surface axially delimit the bearing ring. The running surface has an axial width greater than an axial width of the mounting surface. The first edge surface is spaced from the support element by a gap. In addition, extending axially from a junction of the support element and the mounting surface, a radial width of the gap increases and then decreases.

Further advantages and advantageous embodiments are defined in the claims, the description, and the drawings.

In the following the invention is described in more detail with reference to the exemplary embodiments depicted in the Figures. Here the exemplary embodiments are of a purely exemplary nature and are not intended to establish the scope of the application. This scope is defined solely by the appended claims.

DETAILED DESCRIPTION

Figure 1:
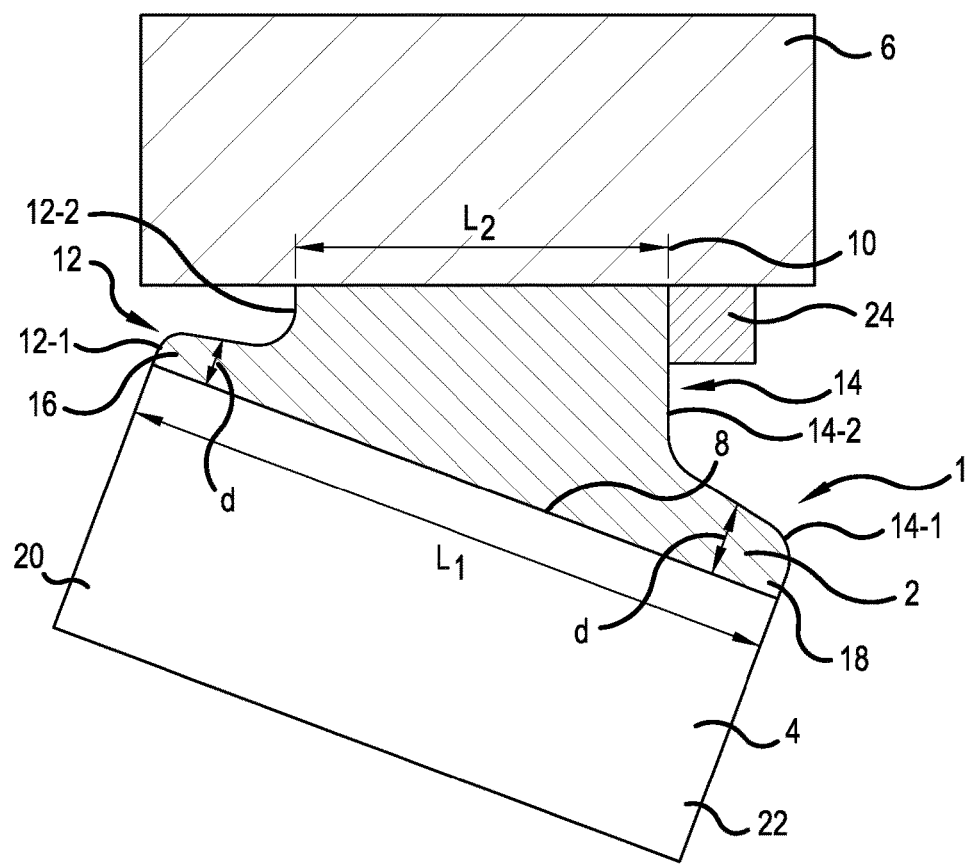
FIG. 1 is a schematic sectional side elevational view of a first preferred exemplary embodiment of a bearing ring according to the present disclosure.

In the following, identical or functionally equivalent elements are designated by the same reference numerals.

FIG. 1 schematically shows a sectional view through a part of a rolling-element bearing assembly 100. The rolling-element bearing assembly 100 includes a rolling-element bearing 1, in this case a tapered roller bearing that has a bearing inner ring (not illustrated), a bearing outer ring 2, and a rolling element 4. As can be seen, the rolling-element bearing 1, or more specifically the outer ring 2, is press-fit in a housing 6.

The bearing outer ring 2 has a running surface 8 along which the rolling element 4 runs. Furthermore, the outer ring 2 includes an outer surface 10 that contacts the housing 6, and the outer ring 2 is press-fit in the housing 6. The bearing outer ring 2 is laterally bounded by edge surfaces 12, 14, which axially delimit the bearing ring 2. The outer surface 10 forms a mounting surface for mounting the outer ring 2 in the housing 6.

FIG. 1 further shows that the bearing outer ring 2 includes flexible edges 16, 18 that can move elastically towards housing 6 if forces are applied over the rolling element 4, especially forces that are not centered over the rolling element 4. This helps reduce or prevent edge stresses between the rolling element 4 and the bearing outer ring 2, even when the bearing ring 2 and/or the rolling element 4 lacks a convex profiling.

In order to form the flexible edges 16, 18, the edge surfaces 12, 14 include a first edge-surface region 12-1, 14-1 and a second edge-surface region 12-2, 14-2. The second edge-surface regions 12-2, 14-2 are offset axially inward from the edge surfaces 12, 14 so that the first edge-surface regions 12-1, 14-1 form the flexible edges 16, 18. A greater or lesser spring action can be achieved depending on the thickness d of the edges 16, 18 thus provided.

Furthermore, FIG. 1 shows that in this exemplary embodiment the axial length L1 of the running surface 8 is larger than the axial length L2 of the outer surface 10 of the bearing ring 2.

Profiling the running surface 8 is disadvantageous, especially when the running surface 8 is part of an outer ring, because the rolling elements are not optimally guided. Therefore, by using the disclosed outer ring configuration having flexible edges 16, 18, edge stress between the bearing ring 2 and the rolling element 4 can be reduced or eliminated even when skewing or offset loading occurs.

Figure 2:
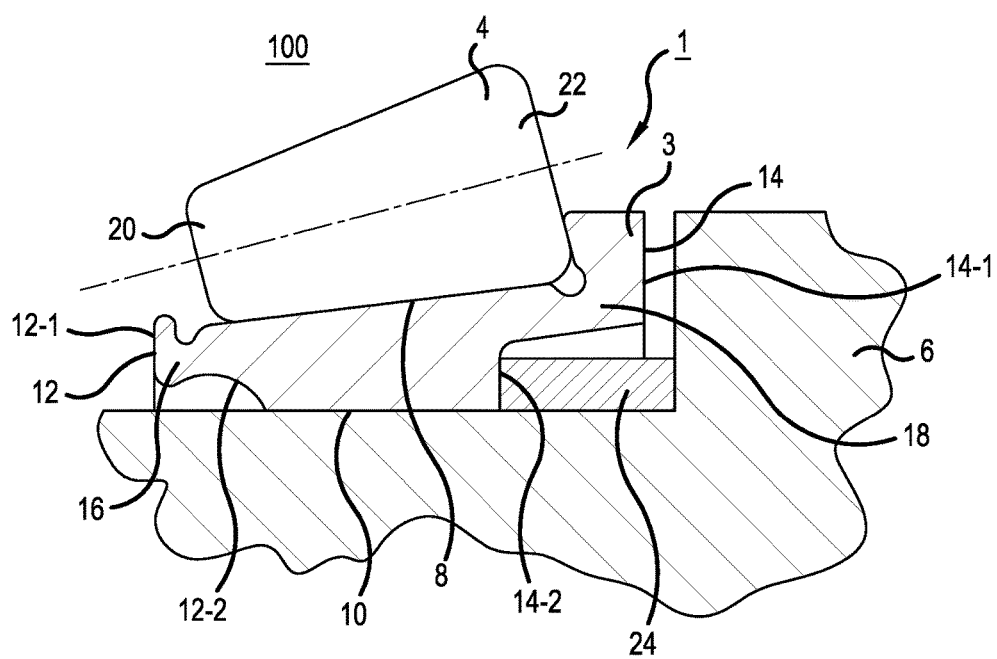
FIG. 2 is a schematic sectional side elevational view of a second preferred exemplary embodiment of a bearing ring according to the present disclosure.

Of course, as FIG. 2 shows, an inner ring can be configured in a similar manner. In an analogous manner to FIG. 1, FIG. 2 schematically shows a sectional view through a part of a rolling-element bearing assembly 100 that includes a tapered rolling-element bearing 1 having an inner ring 3, an outer ring (not illustrated) and the rolling element 4. The rolling-element bearing 1, more specifically the inner ring 3, is press fit in the housing 6.

The bearing inner ring 3 has a running surface 8 along which the rolling element 4 runs. Furthermore, the inner ring 3 includes an inner surface 10 that contacts the housing 6 or other support (not illustrated). The bearing inner ring 3 is laterally bounded by edge surfaces 12, 14, that axially delimit the bearing ring 3. The inner surface 10 forms a mounting surface for mounting the inner ring 6 on the housing 6 or other support.

With continued reference to FIG. 2, flexible edges 16, 18 are formed on the bearing inner ring 3 and can move elastically towards the housing 6 in response to pressure or force being applied over the rolling element 4, and this movement reduces edge stresses between the rolling element 4 and the bearing inner ring 3.

In order to form the flexible edges 16, 18, the edge surfaces 12, 14 include a first edge surface region 12-1, 14-1 and a second edge surface region 12-2, 14-2. The second edge surface regions 12-2, 14-2 are offset axially inward from the edge surfaces 12, 14, so that the first edge surface regions 12-1, 14-1 form the flexible edges 16, 18.

In addition to the embodiments depicted with no profiling, embodiments are also possible in which the rolling elements 4 and either the inner or outer bearing ring is profiled. It is also comprised in the scope of the disclosure that the outer ring 2 has a profiling, and only the inner ring includes flexible edges as described above. Alternatively or in addition to the embodiments depicted in FIGS. 1 and 2, the rolling elements 4 themselves can also be flexible in an edge region 20, 22, so that a reduction of the edge stress is also thereby possible. For this purpose, for example, the rolling elements 4 can be hollowed-out in at least one of the edge regions 20, 22.

Figure 4:
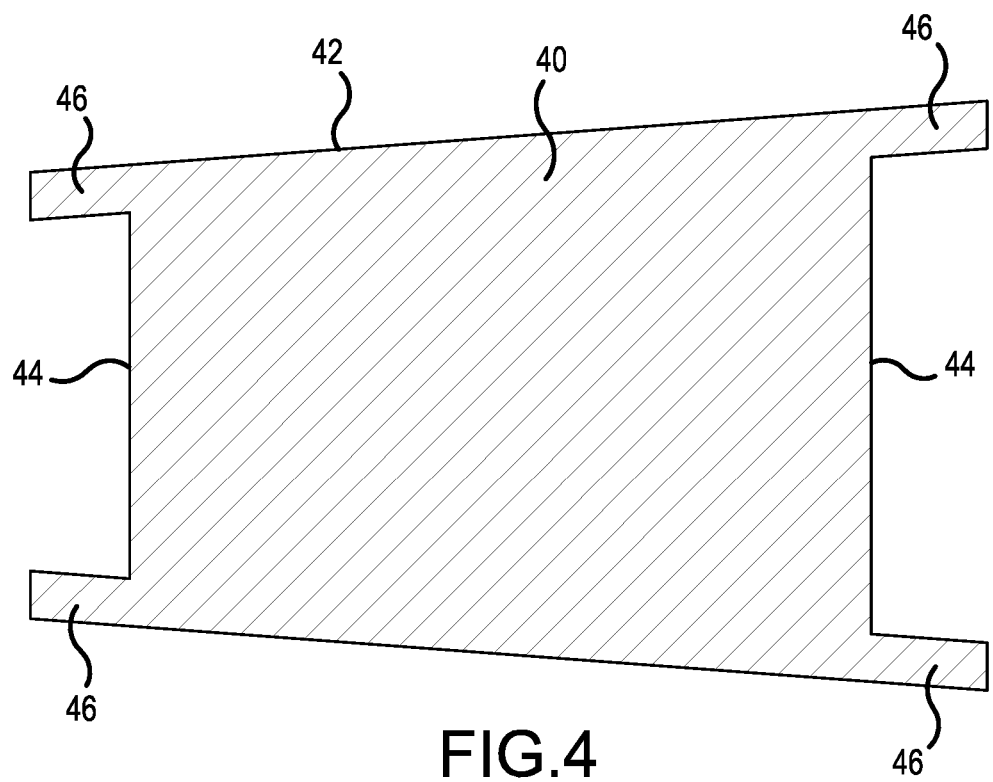
FIG. 4 is a sectional side elevational view of a first tapered rolling element according to an exemplary embodiment.

FIG. 4 shows how the concept of the present disclosure can be applied to a rolling element 40 of a rolling element bearing instead of or in addition to the bearing cages of a rolling element bearing. The rolling element 40 is a rolling element with linear contact for a tapered rolling-element bearing. The rolling element 40 includes a circumferential surface 42 configured to contact a running surface (not illustrated) along a line, and two radial boundary surfaces 44. The circumferential surface 42 has at least one flexible, cantilevered, edge 46, and these edges 46 provide flexibility in response to skew forces applied to a bearing including such rolling elements.

Figure 5:
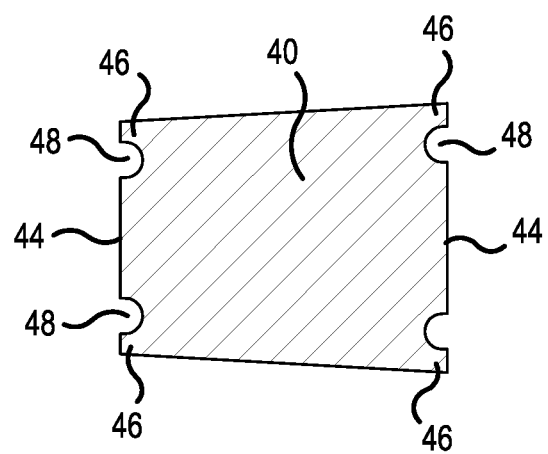
FIG. 5 is a sectional side elevational view of a second tapered rolling element according to an exemplary embodiment.

FIG. 5 shows another exemplary embodiment of a rolling element 40 of a tapered rolling element bearing that includes cantilevers 46, in this case formed by grooves 48 in the boundary surfaces 44.

Tapered roller bearings may tend to shift axially toward the side of the bearing having the smaller diameter. Therefore, a securing element 24 may be provided for axially securing the outer ring 2 or the inner ring 3. The securing element 24 preferably abuts directly on the edge surface 14, in the depicted exemplary embodiment, in particular on the set-back edge surface region 14-2, in order to limit an axial movement of the bearing ring 2; 3. The securing element 24 can be configured as a snap ring or locking ring; however, it is also possible to configure the securing element 24 as an integral component of the housing 6. However, in order to ensure a sufficient flexibility of the edge 18, the securing element 24 should be disposed at least at a sufficient distance from the edge 18.

Figure 3:
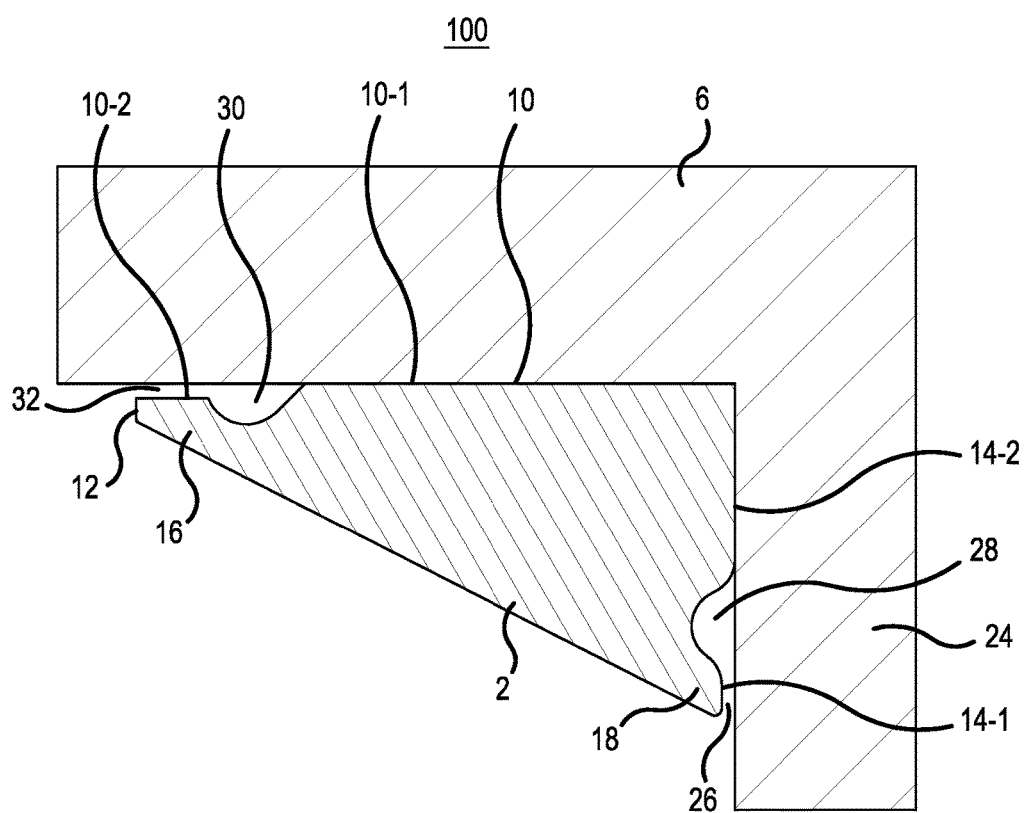
FIG. 3 is a schematic sectional side elevational view of a third preferred exemplary embodiment of a bearing ring according to the present disclosure.

If a design spaced in this manner is not possible, then FIG. 3 shows a further advantageous exemplary embodiment of a bearing ring. In this embodiment, the housing 6 is formed integrally with a securing element 24, and the securing element 24 extends beyond the radial length of the bearing ring 2. Such housing designs provide a particularly secure holding of the bearing ring 2. However, in order to also reduce an edge stress over the flexible edges 16, 18, the edge surface 14 is formed such that the second edge region 14-2 is not offset axially inward, but the first edge region 14-1 is offset axially inward, so that a gap 26 is produced between the edge 18 or the first edge region 14-1 and the securing element 24. In order to provide a flexibility of the edge 18, a flexibility groove 28 is further provided, and this makes possible an elastic design of the edge 18.

FIG. 3 further shows that another flexibility groove 30 may be formed in the outer surface 10. In addition, it can be seen that the edge 16 is not configured over the edge region 12 as in FIG. 1, since the edge surface 12 is already very narrow, but rather the outer surface 10 includes a first outer-surface region 10-1 and a second outer-surface region 10-2, and the second outer-surface region 10-2 is offset radially inward so that a gap 32 remains between housing 6 and second outer-surface region 10-2. The second outer-surface region 10-2 merges directly into the edge region 12, and together with the edge region 12 forms the flexible edge 16. The gap 32 and the flexibility groove 30 provide a flexibility of the edge 16 in the event of pressure load.

Overall, using the disclosed bearing ring and/or rolling element including flexible edges a rolling-element bearing can be provided that has reduced edge stress and thus a longer service life. The disclosed rolling-element bearing simultaneously enables contact of the rolling element on the running surface of the bearing rings to be maximized, so that a pressure load on the rolling element is less than in the case of conventional rolling element bearings. Since according to the disclosure the edges are designed to be flexible, a uniform loading can nevertheless be achieved even in the region of the edges in the event of skewing.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing rings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

100 Rolling-element bearing assembly
1 Rolling-element bearing
2 Bearing outer ring
3 Bearing inner ring
4 Rolling element
6 Housing
8 Running surface
10 Outer surface of the bearing ring
12, 14 Edge surfaces of the bearing ring
12-1, 14-1 First edge-surface region
12-2, 14-2 Second edge-surface region
16, 18 Flexible edges
20, 22 Edge region of the rolling element
24 Securing element
26, 32 Gap
28, 30 Flexibility groove
d Thickness of the flexible edge
L1 Length of the raceway
L2 Length of the outer surface
40 rolling element
42 circumferential surface
44 boundary surface
46 cantilevered edges
48 groove

What is claimed is:

1. A rolling-element bearing assembly comprising:
a support element, and
a bearing ring mounted on the support element,
the bearing ring comprising:
a substantially axial mounting surface in contact with the support element, and
a running surface configured to support a rolling element, the running surface having a first edge and a second edge axially spaced from the first edge,
wherein the running surface has an axial width greater than an axial width of the mounting surface,
wherein the bearing ring includes a first cantilevered portion having a top surface, the top surface of the first cantilevered portion comprising a first end portion of the running surface and the first cantilevered portion having a bottom surface facing the support element,
wherein the first cantilevered portion does not contact the support element, and
wherein, extending axially from a junction of the support element and the mounting surface, a radial width of the first cantilevered portion decreases and then increases.

2. The rolling-element bearing assembly according to claim 1, wherein the first cantilevered portion is flexible.

3. The rolling-element bearing assembly according to claim 1, wherein the rolling element bearing comprises a tapered roller element bearing.

4. The rolling-element bearing assembly according to claim 1, including a second cantilevered portion having a top surface, the top surface of the second cantilevered portion comprising a second end portion of the running surface and the second cantilevered portion having a bottom surface facing the support element.

5. The rolling-element bearing assembly according to claim 4, wherein the second cantilevered portion does not contact the support element.

6. The rolling-element bearing assembly according to claim 5, wherein the second cantilevered portion is flexible.

7. The rolling-element bearing assembly according to claim 5, wherein the rolling element bearing comprises a tapered roller element bearing.

8. The rolling-element bearing assembly according to claim 1, wherein the substantially axial mounting surface is the only portion of the bearing ring in contact with the support element.

9. The rolling-element bearing assembly according to claim 1, wherein the radial width of the first cantilevered portion, after decreasing and then increasing, decreases again in a direction axially away from the mounting surface.

10. The rolling-element bearing assembly according to claim 1,
wherein the bearing ring further includes a first edge surface extending from the first edge of the running surface to the axial mounting surface and a second edge surface extending from the second edge of the running surface to the axial mounting surface, the first edge surface and the second edge surface axially delimiting the bearing ring, wherein the first edge surface is spaced from the support element by a gap, and wherein, extending axially from the junction of the support element and the mounting surface, a radial width of the gap increases and then decreases.

11. The rolling-element bearing assembly according to claim 10, wherein the substantially axial mounting surface is the only portion of the bearing ring in contact with the support element.

12. A rolling-element bearing assembly comprising:
a support element, and
a bearing ring mounted on the support element,
the bearing ring comprising:
a substantially axial mounting surface in contact with the support element,
a running surface configured to support a rolling element, the running surface having a first edge and a second edge axially spaced from the first edge, and
a first edge surface extending from the first edge of the running surface to the axial mounting surface and a second edge surface extending from the second edge of the running surface to the axial mounting surface, the first edge surface and the second edge surface axially delimiting the bearing ring, wherein the running surface has an axial width greater than an axial width of the mounting surface, wherein the first edge surface is spaced from the support element by a gap, and wherein, starting from a junction of the support element and the mounting surface and extending axially from the junction of the support element and the mounting surface, a radial width of the gap increases and then decreases.

13. The rolling-element bearing assembly according to claim 12, wherein the rolling element bearing comprises a tapered roller element bearing.

14. The rolling-element bearing assembly according to claim 12, wherein the substantially axial mounting surface is the only portion of the bearing ring in contact with the support element.

15. The rolling-element bearing assembly according to claim 12, wherein, extending axially from the junction of the support element and the mounting surface the radial width of the gap, after increasing and then decreasing, increases again.

* * * * *